(12) United States Patent
Zhang et al.

(10) Patent No.: US 11,298,732 B2
(45) Date of Patent: Apr. 12, 2022

(54) METHOD FOR CO-PROCESSING OF WASTE INCINERATION FLY ASH AND CHROMIUM SLAG IN LANDFILL

(71) Applicants: QINGDAO UNIVERSITY OF TECHNOLOGY, Shandong (CN); QINGDAO JIEHUA ENVIRONMENTAL TECHNOLOGY CO., LTD., Shandong (CN)

(72) Inventors: Dalei Zhang, Shandong (CN); Jianxue Zhao, Shandong (CN)

(73) Assignees: QINGDAO UNIVERSITY OF TECHNOLOGY, Qingdao (CN); QINGDAO JIEHUA ENVIRONMENTAL TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 16/722,818

(22) Filed: Dec. 20, 2019

(65) Prior Publication Data
US 2021/0245211 A1    Aug. 12, 2021

Related U.S. Application Data

(63) Continuation of application No. PCT/CN2018/091851, filed on Jun. 19, 2018.

(30) Foreign Application Priority Data

Jun. 20, 2017    (CN) .......................... 201710471506.4

(51) Int. Cl.
*B09B 3/00*    (2006.01)
*C02F 1/467*    (2006.01)
(Continued)

(52) U.S. Cl.
CPC .............. *B09B 3/00* (2013.01); *C02F 1/4672* (2013.01); *B09B 2220/06* (2013.01);
(Continued)

(58) Field of Classification Search
CPC ..... B09B 3/00; B09B 2220/06; C02F 1/4672; C02F 2305/026
See application file for complete search history.

(56) References Cited

U.S. PATENT DOCUMENTS 5,562,588 A * 10/1996 Higgins .................... B09C 1/10
588/256
2008/0103348 A1* 5/2008 Tunstall .................. C22B 7/006
588/320

FOREIGN PATENT DOCUMENTS

CN       103978025 A     8/2014
CN       105964683 A     9/2016
(Continued)

*Primary Examiner* — Janine M Kreck

(57) ABSTRACT

Disclosed is a method of simultaneously processing fly ash and COPR, which can treat the fly ash and COPR harmlessly during the landfilling process through biochemical and engineering measures. The method includes: transferring the fly ash and COPR to the yard; laying an impervious layer inside the yard; laying a diversion material at a bottom of the yard; laying a mixture layer on the diversion material, where the mixture layer contains a biogas residue, a waste carbon source, ferrous sulfate, a nutritional additive, the waste incineration fly ash and COPR; placing an internal-electrolysis ceramsite layer on the mixture layer; injecting a carbon source solution from an upper portion of the yard and collecting a leachate to a collection device through the diversion material irregularly during the operation; and recirculating the leachate to a top of the yard for spray reinjection.

16 Claims, 1 Drawing Sheet

(51) Int. Cl.
    *C02F 1/461* (2006.01)
    *C02F 103/16* (2006.01)
(52) U.S. Cl.
    CPC ............... *C02F 2001/46185* (2013.01); *C02F 2103/16* (2013.01); *C02F 2305/026* (2013.01)

(56) References Cited

FOREIGN PATENT DOCUMENTS

| | | | |
|---|---|---|---|
| CN | 106031928 A | | 10/2016 |
| CN | 106040734 A | | 10/2016 |
| CN | 107497819 A | * | 12/2017 |
| CN | 107497819 A | | 12/2017 |
| JP | 2000093934 A | | 4/2000 |

* cited by examiner

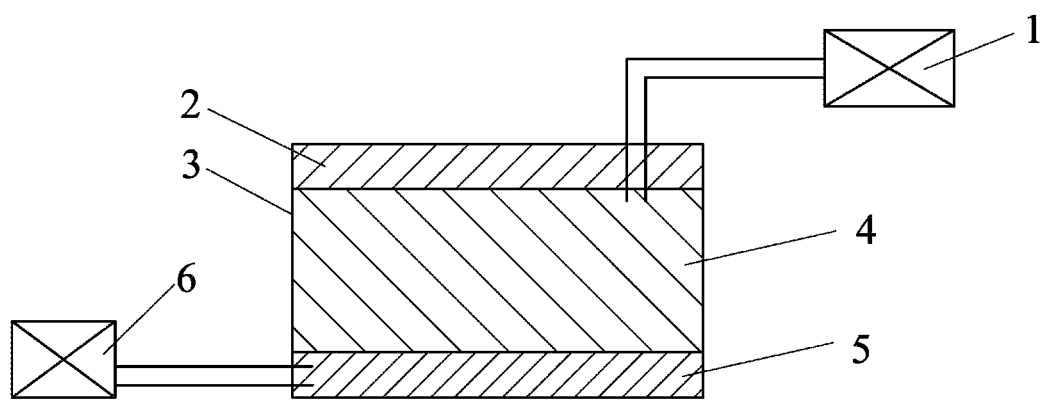

METHOD FOR CO-PROCESSING OF WASTE INCINERATION FLY ASH AND CHROMIUM SLAG IN LANDFILL

CROSS-REFERENCE TO RELATED APPLICATIONS

This application is a continuation of International Patent Application No. PCT/CN2018/091851, filed on Jun. 19, 2018, which claims the benefit of priority from Chinese Patent Application No. 201710471506.4, filed on Jun. 20, 2017. The content of the aforementioned application, including any intervening amendments, is incorporated herein by reference in its entirety.

TECHNICAL FIELD

This application relates to environmental protection, and more particularly to a method for simultaneously processing waste incineration fly ash and chromite ore processing residue (COPR) in a landfill.

BACKGROUND

Due to high levels of heavy metals and dioxin-like persistent organic pollutants, the waste incineration fly ash is generally considered as hazardous waste. As another hazardous waste, COPR is also required to be properly disposed. Currently, the waste incineration fly ash and COPR are generally treated by landfilling. However, the landfilling process involves the use of a large amount of land, and considerable floating dust will be generated in the air during the transfer and open-air landfilling of the waste incineration fly ash, which not only increase the dust content in the air, but also may promote the ecological toxicity of smog, causing serious air pollution and endangering the human health and ecological environment.

SUMMARY

An object of this application is to provide a method for simultaneously processing a waste incineration fly ash and a COPR in a landfill to overcome the defects in the prior art, where special biochemical and engineering measures are adopted in the landfilling process.

Technical solutions of the invention are described as follows.

The invention provides a method for simultaneously processing a waste incineration fly ash and a COPR in a landfill, comprising:
  laying an impervious layer at inner side walls of a yard;
  laying a diversion material at a bottom of the yard;
  laying a mixture layer on the diversion material, wherein the mixture layer comprises a biogas residue, a waste carbon source, ferrous sulfate, a nutritional additive, the waste incineration fly ash and COPR;
  placing an internal-electrolysis ceramsite layer on the mixture layer;
  injecting a solution of a carbon source solution from an upper portion of the yard and collecting a leachate to a collection device through the diversion material irregularly during the operation; and
  recirculating the leachate to a top of the yard for spray reinjection.

In an embodiment, in the mixture layer, a weight ratio of the waste incineration fly ash to COPR to the biogas residue to the waste carbon source to ferrous sulfate to the nutritional additive is 1:(0.1-10):(0.01-5):(0.01-5):(0.15-3):(0.1-1).

In an embodiment, the mixture layer has a thickness of 1-8 m and the internal-electrolysis ceramsite layer has a thickness equal to or less than 1 m.

In an embodiment, the spray reinjection of the leachate is performed at a time interval of 1-48 h.

In an embodiment, the method further comprises: adjusting the leachate to pH 2-5 before the recirculation.

In an embodiment, the biogas residue is organic wastewater, solid organic waste or sludge.

In an embodiment, the biogas residue is an anaerobically-treated solid organic waste.

In an embodiment, the injection of the carbon source solution is performed once every 1-100 days.

In an embodiment, the nutritional additive is selected from the group consisting of a nitrogen source, a phosphorus source, a trace element source and a combination thereof.

In an embodiment, in the carbon source solution, a carbon source is 50% or less by weight.

In an embodiment, the trace element source is selected from the group consisting of boron, zinc, copper, manganese, cobalt and a combination thereof.

In an embodiment, the carbon source solution is a solution comprising ethanol, methanol, acetic acid or a combination thereof.

In an embodiment, the carbon source solution is further doped with ferrous sulfate.

In an embodiment, the waste incineration fly ash is a biochemically-, physically- or chemically-treated fly ash.

In an embodiment, COPR is a chromium-containing soil or a chromium-containing waste.

In an embodiment, the internal-electrolysis ceramsite layer comprises an internal-electrolysis ceramsite, which is also referred to as a micro-electrolytic ceramsite and can generate current spontaneously under certain conditions.

In an embodiment, the internal-electrolysis ceramsite is a Fe—C internal-electrolysis ceramsite containing metallic iron and a carbon material, which is capable of generating current under acidic conditions.

The action mechanism and beneficial effects of the invention are described as follows.

The mechanism for treating heavy metals and dioxins in fly ash by this method is described as follows. The ferrous sulfate first reduces hexavalent chromium in COPR, and then the sulfate reducing bacteria in the biogas residue convert the sulfate into sulfides in the presence of the waste carbon source. Finally, the heavy metal ions are reacted with the sulfides to form precipitates with extremely low solubility, so that the dissolution of hexavalent chromium is reduced, achieving the harmless treatment of COPR. Moreover, the dioxin in the fly ash is extracted into the leachate through the carbon source solution and the organic matter generated under the degrading action of microorganisms in the biogas residue, and then recirculated to the top of the yard. Finally, hydroxyl radicals are generated under the electrocatalytic action of the internal-electrolysis ceramsite to further promote the decomposition of the dioxin in the leachate. Fe ions released from ferrous sulfate are coupled with a small amount of hydroxyl radicals generated by electrocatalysis to generate Fenton reaction, effectively degrading the dioxin and removing other refractory organic matters from the biogas residue.

Due to the presence of the leaching solution of the biogas residue, the leachate contains a large number of macromolecular organic matters such as microbial residues, which render it difficult to be biologically used, that is, the leachate has relatively poor biodegradability. After the leachate is recirculated to the top of the yard, the macromolecules therein are converted into small molecules under the action of internal-electrolysis ceramsite, improving the biodegradability. Therefore, the leachate can be better utilized by the microorganisms in the biogas residue after entering the mixture layer, accelerating the biodegradation overall.

At the same time, the large amount of $Cl^-$ in the fly ash can be converted into $Cl_2$ to be removed through the internal electrolysis after extracted into the leachate, reducing the chlorine content in the landfill. Moreover, the generated $Cl_2$ can also kill the harmful microorganisms in the landfill.

The method provided herein can significantly reduce the damages of the waste incineration fly ash and COPR to the environment.

BRIEF DESCRIPTION OF THE DRAWINGS

The invention will be described in detail below with reference to the embodiments and drawings to make the technical solutions clearer. Obviously, these embodiments are not intended to limit the invention, and those skilled in the art can obtain other drawings based on the drawings submitted herein without sparing any creative effort.

FIGURE schematically shows a system for implementing a method for simultaneously processing waste incineration fly ash and COPR in a landfill according to the present invention.

In the drawings: 1—acid-feeding device; 2—internal-electrolysis ceramsite layer; 3—impervious layer; 4—mixture layer; 5—diversion material; and 6—leachate storage tank.

DETAILED DESCRIPTION OF EMBODIMENTS

The invention will be described clearly and completely below with reference to the embodiments to make objects, technical solutions and advantages of the invention clearer. Unless otherwise specified, the operations in the embodiments are performed under conventional conditions or the conditions recommended by the manufacturer. Unless otherwise specified, the reagents and instruments used herein are conventional products that are commercially available.

FIGURE is a schematic diagram of a method for simultaneously processing waste incineration fly ash and COPR in a landfill according to the present invention. As shown in the FIGURE, the method includes laying an impervious layer 3 at inner side walls of a yard; laying a diversion material 5 at a bottom of the yard; laying a mixture layer 4 on the diversion material 5, where the mixture layer comprises a biogas residue, a waste carbon source, ferrous sulfate, a nutritional additive, the waste incineration fly ash and COPR; and placing an internal-electrolysis ceramsite layer 2 on the mixture layer 4.

In the mixture layer 4, a weight ratio of the waste incineration fly ash to COPR to the biogas residue to the waste carbon source to ferrous sulfate to the nutritional additive is 1:(0.1-10):(0.01-5):(0.01-5):(0.15-3):(0.1-1). The mixture layer 4 has a thickness of 1-8 in and the internal-electrolysis ceramsite layer has a thickness equal to or less than 1 in. The biogas residue is organic wastewater, solid organic waste or sludge, where the solid organic waste may be subjected to anaerobic treatment first and then used as the biogas residue. The nutritional additive is selected from the group consisting of a nitrogen source, a phosphorus source, a trace element source and a combination thereof, which can further promote the activity of microorganisms in the biogas residue, enhancing the ability to treat persistent organic pollutants (POPs). The trace element is optionally selected from the group consisting of boron, zinc, copper, manganese, cobalt and a combination thereof. The fly ash is an untreated waste incineration fly ash, or a biochemically-, physically- or chemically-treated fly ash. For example, the fly ash may be a thermally-treated, hydrothermally-treated or chemically-stabilized fly ash. COPR of the invention a chromium-containing soil or a chromium-containing waste.

After the layers are laid, a carbon source solution is injected from the upper portion of the yard irregularly and the leachate is irregularly collected to the collection device through the diversion material 5. The leachate is then recirculated to the top of the yard for spray reinjection. The carbon source solution is a solution comprising ethanol, methanol, acetic acid or a combination thereof, which not only can be consumed by microorganisms, but also can be used to extract the persistent organic pollutants such as dioxin from the fly ash. The carbon source solution is optionally doped with ferrous sulfate, and contains 50% or less by weight of a carbon source.

Further, the spray reinjection of the leachate is performed at a time interval of 1-48 h. The leachate may be adjusted to pH 2-5 before the recirculation, where the pH adjustment can be performed using the acid-feeding device 1. Fe ions released from ferrous sulfate are coupled with a small amount of hydroxyl radicals generated by electrocatalysis to generate Fenton reaction, effectively degrading the dioxin and removing other refractory organic matters from the biogas residue. The injection of the carbon source solution is optionally performed once every 1-100 days.

Compared to the prior art, the invention has the following beneficial effects.

1. The ferrous sulfate employed herein can not only facilitate the harmless treatment for COPR, but also release ferrous ions and sulfate ions, where the ferrous ion promotes the generation of Fenton reaction and the sulfate ion can be used as a raw material for sulfate-reducing bacteria in the biogas residues to further participate in the subsequent biochemical reaction.

2. With the adjustment of pH to 2-5 and the release of Fe ions from ferrous sulfate, hydroxyl radicals are generated under the electrocatalytic action, which leads to the generation of Fenton reaction (a kind of advanced oxidation), so that the dioxin in fly ash can be dechlorinated to be converted into less harmful organic matters. Moreover, the dioxin can also be processed through the metabolism of the microorganisms in the biogas residue, providing the co-treatment of advanced oxidation and biochemical degradation for the dioxin pollution.

3. The invention adopts a waste biogas residue to treat the fly ash, which not only achieves the treatment of the fly ash, but also reduces the pollution of biogas residue.

4. Compared to the chemical reagents for immobilizing heavy metals, the biogas residue used herein, in which the sulfate-reducing bacteria are capable of fully reducing the sulfate ions to sulfide ions to precipitate the heavy metals, has the advantage of ecological safety.

5. The addition of phosphorus sources, nitrogen sources or trace elements can further promote the activity of microorganisms in biogas residues, enhancing the ability to treat the dioxin pollutants.

6. Due to the presence of the leaching solution of the biogas residue, the leachate contains a large number of macromolecular organic matters such as microbial residues, which render it difficult to be biologically used, that is, the leachate has relatively poor biodegradability. After the leachate is recirculated to the top of the yard, the macromolecules therein are converted into small molecules under the action of internal-electrolysis ceramsite, improving the biodegradability. Therefore, the leachate can be better utilized by the microorganisms in the biogas residue after entering the mixture layer, accelerating the biodegradation overall.

7. The large amount of $Cl^-$ in the fly ash can be converted into $Cl_2$ to be removed through the internal electrolysis after extracted into the leachate, reducing the chlorine content in the landfill. Moreover, the generated $Cl_2$ can also kill the harmful microorganisms in the landfill.

8. The acid added to the internal-electrolysis ceramsite not only plays an important role in promoting the internal-electrolysis ceramsite to exert its function, but also can neutralize highly alkaline hazardous waste such as COPR and fly ash, making the landfill tend to be neutral.

The features and advantages of the invention are described below in detail with reference to the embodiments.

Example 1

Provided herein was a method for simultaneously processing waste incineration fly ash and a COPR in a landfill, which was specifically described as follows. The waste incineration fly ash and COPR were transferred to a yard. An impervious layer 3 was laid at inner side walls of the yard and a diversion material 5 was laid at a bottom of the yard. A mixture layer 4 consisting of the waste incineration fly ash, COPR, a biogas residue, a waste carbon source, ferrous sulfate and a nutritional additive in a weight ratio of 1:0.5:0.2:0.2:0.15:0.1 was laid on the diversion material 5, where the waste carbon source was a food waste, and the nutritional additive was a mixture of potassium phosphate, ammonium nitrate and cobalt nitrate doped with a trace amount of zinc. The mixture layer 4 had a thickness of 5 in. An internal-electrolysis ceramsite layer 2 with a thickness of 0.1 in was laid on the mixture layer 4, where the internal-electrolysis ceramsite was a Fe—C internal-electrolysis ceramsite. A solution of a carbon source solution was injected from an upper portion of the yard every other 1-5 days during the operation, where the carbon source solution was an ethanol solution. A leachate was collected to a collection device through the diversion material 5 and then recirculated to a top of the yard for reinjection every other 1 day. The leachate was adjusted to pH 4 before the recirculation.

After 60 days of the treatment, the solid hexavalent chromium in the yard was reduced from 3000 mg/kg to less than 2 mg/kg; the leaching rate of the heavy metals in the solid waste was decreased by 91%; the Pb content was decreased from 5 mg/L to less than 0.1 mg/L; the Cd content was decreased from 3 mg/L to less than 0.1 mg/L; and the removal rate of pollutants such as dioxin exceeded 99%, meeting the related standards.

Example 2

Provided herein was a method for simultaneously processing waste incineration fly ash and a COPR in a landfill, which was specifically described as follows. The waste incineration fly ash and COPR were transferred to a yard. An impervious layer 3 was laid at inner side walls of the yard and a diversion material 5 was laid at a bottom of the yard. A mixture layer 4 consisting of the waste incineration fly ash, COPR, a biogas residue, a waste carbon source, ferrous sulfate and a nutritional additive in a weight ratio of 1:2:0.5:0.4:0.3:0.1 was laid on the diversion material 5, where the waste carbon source was a food waste, and the nutritional additive was a mixture of potassium phosphate, ammonium nitrate and cobalt nitrate doped with a trace amount of zinc. The mixture layer 4 had a thickness of 5 tn. An internal-electrolysis ceramsite layer 2 with a thickness of 0.01 in was laid on the mixture layer 4, where the internal-electrolysis ceramsite was a Fe—C internal-electrolysis ceramsite. An ethanol solution was injected from an upper portion of the yard every other 30 days during the operation. A leachate was collected to a collection device through the diversion material 5 and then recirculated to a top of the yard for reinjection every other 2 days. The leachate was adjusted to pH 4 before the recirculation.

After 60 days of the treatment, the solid hexavalent chromium in the yard was reduced from 3000 mg/kg to less than 2 mg/kg; the leaching rate of the heavy metals in the solid waste was decreased by 91%; the Pb content was decreased from 5 mg/L to less than 0.1 mg/L; the Cd content was decreased from 3 mg/L to less than 0.1 mg/L; and the content of pollutant dioxin was lowered from 500 ng/kg to 8 ng/kg with a removal rate exceeding 99%, meeting the related standards. In addition, COD of the leachate was lowered from more than 10000 mg/L to less than 200 mg/L.

Example 3

Provided herein was a method for simultaneously processing waste incineration fly ash and a COPR in a landfill, which was specifically described as follows. The waste incineration fly ash and COPR were transferred to a yard. An impervious layer 3 was laid at inner side walls of the yard and a diversion material 5 was laid at a bottom of the yard. A mixture layer 4 consisting of the waste incineration fly ash, COPR, a biogas residue, a waste carbon source, ferrous sulfate and a nutritional additive in a weight ratio of 1:1.5:0.5:0.4:0.2:0.1 was laid on the diversion material 5, where the waste carbon source was a food waste and the nutritional additive was a mixture of potassium phosphate, ammonium nitrate and cobalt nitrate doped with a trace amount of zinc. The mixture layer 4 had a thickness of 5 m. An internal-electrolysis ceramsite layer 2 was absent in this example. An ethanol solution was injected from an upper portion of the yard every other 25 days during the operation. A leachate was collected to a collection device through the diversion material 5 and then recirculated to a top of the yard for reinjection every other 2 days. The leachate was adjusted to pH 4 before the recirculation.

After 70 days of the treatment, the solid hexavalent chromium in the yard was reduced from 3000 mg/kg to less than 2 mg/kg; the leaching rate of the heavy metals in the solid waste was decreased by 91%; the Pb content was decreased from 5 mg/L to less than 0.1 mg/L; the Cd content was decreased from 3 mg/L to less than 0.1 mg/L; and the removal rate of pollutants such as dioxin exceeded 99%, meeting the related standards. In addition, COD of the leachate was lowered from more than 10000 mg/L to less than 500 mg/L.

Example 4

Provided herein was a method for simultaneously processing waste incineration fly ash and a COPR in a landfill, which was specifically described as follows. The waste incineration fly ash and COPR were transferred to a yard. An impervious layer 3 was laid at inner side walls of the yard and a diversion material 5 was laid at a bottom of the yard. A mixture layer 4 consisting of the waste incineration fly ash, COPR, a biogas residue, a waste carbon source, ferrous sulfate and a nutritional additive in a weight ratio of 1:2: 0.5:0.4:0.3:0.1 was laid on the diversion material 5, where the waste carbon source was a food waste, and the nutritional additive was a mixture of potassium phosphate, ammonium nitrate and cobalt nitrate doped with a trace amount of zinc. The mixture layer 4 had a thickness of 5 m. An internal-electrolysis ceramsite layer 2 with a thickness of 0.01 m was laid on the mixture layer 4. An ethanol solution doped with ferrous sulfate was injected from an upper portion of the yard every other 30 days during the operation. A leachate was collected to a collection device through the diversion material 5 and then recirculated to a top of the yard for reinjection every other 2 days. The leachate was adjusted to pH 4 before the recirculation.

After 70 days of the treatment, the solid hexavalent chromium in the yard was reduced from 3000 mg/kg to less than 2 mg/kg; the leaching rate of the heavy metals in the solid waste was decreased by 91%; the Pb content was decreased from 5 mg/L to less than 0.1 mg/L; the Cd content was decreased from 3 mg/L to less than 0.1 mg/L; and the content of pollutant dioxin was lowered from 500 ng/kg to 8 ng/kg with a removal rate exceeding 99%, meeting the related standards. In addition, COD of the leachate was lowered from more than 10000 mg/L to less than 300 mg/L.

Example 5

Provided herein was a method for simultaneously processing waste incineration fly ash and a COPR in a landfill, which was specifically described as follows. The waste incineration fly ash and COPR were transferred to a yard. An impervious layer 3 was laid at inner side walls of the yard and a diversion material 5 was laid at a bottom of the yard. A mixture layer 4 consisting of the waste incineration fly ash, COPR, a biogas residue, a waste carbon source, ferrous sulfate and a nutritional additive in a weight ratio of 1:6:2: 2:1.5:0.5 was laid on the diversion material 5, where the waste carbon source was a food waste and the nutritional additive was a mixture of potassium phosphate, ammonium nitrate and cobalt nitrate doped with a trace amount of zinc. The mixture layer 4 had a thickness of 5 tn. An internal-electrolysis ceramsite layer 2 with a thickness of 0.1 in was laid on the mixture layer 4. A solution of a carbon source solution was injected from an upper portion of the yard every other 70 days during the operation, where the carbon source solution was a methanol solution. A leachate was collected to a collection device through the diversion material 5 and then recirculated to a top of the yard for reinjection every other 1 hour. The leachate was adjusted to pH 2 before the recirculation.

After 80 days of the treatment, the solid hexavalent chromium in the yard was reduced from 3000 mg/kg to less than 2 mg/kg; the leaching rate of the heavy metals in the solid waste was decreased by 91%; the Pb content was decreased from 5 mg/L to less than 0.1 mg/L; the Cd content was decreased from 3 mg/L to less than 0.1 mg/L; and the removal rate of pollutants such as dioxin exceeded 99%, meeting the related standards. In addition, COD of the leachate was lowered from more than 10000 mg/L to less than 100 mg/L.

Example 6

Provided herein was a method for simultaneously processing waste incineration fly ash and a COPR in a landfill, which was specifically described as follows. The waste incineration fly ash and COPR were transferred to a yard. An impervious layer 3 was laid at inner side walls of the yard and a diversion material 5 was laid at a bottom of the yard. A mixture layer 4 consisting of the waste incineration fly ash, COPR, a biogas residue, a waste carbon source, ferrous sulfate and a nutritional additive in a weight ratio of 1:3.5: 2:2.5:2:0.5 was laid on the diversion material 5, where the waste carbon source was a food waste and the nutritional additive was a mixture of potassium phosphate, ammonium nitrate and cobalt nitrate doped with a trace amount of zinc. The mixture layer 4 had a thickness of 1 m. An internal-electrolysis ceramsite layer 2 with a thickness of 0.6 m was laid on the mixture layer 4. a carbon source solution was injected from an upper portion of the yard every other 100 days during the operation, where the carbon source solution was an acetic acid solution. A leachate was collected to a collection device through the diversion material 5 and then recirculated to a top of the yard for reinjection every other 2 days. The leachate was adjusted to pH 5 before the recirculation.

After 120 days of the treatment, the solid hexavalent chromium in the yard was reduced from 3000 mg/kg to less than 2 mg/kg; the leaching rate of the heavy metals in the solid waste was decreased by 91%; the Pb content was decreased from 5 mg/L to less than 0.1 mg/L; the Cd content was decreased from 3 mg/L to less than 0.1 mg/L; and the removal rate of pollutants such as dioxin exceeded 99%, meeting the related standards.

Example 7

Provided herein was a method for simultaneously processing waste incineration fly ash and a COPR in a landfill, which was specifically described as follows. The waste incineration fly ash and COPR were transferred to a yard. An impervious layer 3 was laid at inner side walls of the yard and a diversion material 5 was laid at a bottom of the yard. A mixture layer 4 consisting of the waste incineration fly ash, COPR, a biogas residue, a waste carbon source, ferrous sulfate and a nutritional additive in a weight ratio of 1:10: 5:5:3:1 was laid on the diversion material 5, where the waste carbon source was a food waste, and the nutritional additive was a mixture of potassium phosphate, ammonium nitrate and cobalt nitrate doped with a trace amount of zinc. The mixture layer 4 had a thickness of 8 m. An internal-electrolysis ceramsite layer 2 with a thickness of 1 m was laid on the mixture layer 4. a carbon source solution doped with ferrous sulfate was injected from an upper portion of the yard every other 30 days during the operation, where the carbon source solution was a methanol solution. A leachate was collected to a collection device through the diversion material 5 and then recirculated to a top of the yard for reinjection every other 1 day. The leachate was adjusted to pH 4 before the recirculation.

After 60 days of the treatment, the solid hexavalent chromium in the yard was reduced from 3000 mg/kg to less than 2 mg/kg; the leaching rate of the heavy metals in the solid waste was decreased by 91%; the Pb content was decreased from 5 mg/L to less than 0.1 mg/L; the Cd content was decreased from 3 mg/L to less than 0.1 mg/L; and the removal rate of pollutants such as dioxin exceeded 99%, meeting the related standards. In addition, COD of the leachate was lowered from more than 10000 mg/L to less than 200 mg/L.

Described above are merely preferred embodiments of the invention, which are intended to illustrate the principles, features and advantages of the invention. It should be understood that these embodiments are not intended to limit the invention. Various modifications, changes and improvements made by those skilled in the art without departing from the spirit of the invention should fall within the scope of the invention defined by the appended claims.

INDUSTRIAL APPLICABILITY

In the method provided herein for simultaneously processing a waste incineration fly ash and a COPR in a landfill, a carbon source solution is used to extract dioxin from the fly ash, and then the dioxin is decomposed under the action of the internal-electrolysis ceramsite. Moreover, the heavy metals are reacted with sulfides to form precipitates with extremely low solubility, achieving the harmless treatment of COPR. This method can not only significantly reduce the damages of the waste incineration fly ash and COPR to the environment, but also effectively degrade the organic matter in the organic waste such as biogas residue, facilitating the rapid treatment of harmful wastes.

What is claimed is:

1. A method for simultaneously processing a waste incineration fly ash and a chromite ore processing residue (COPR) in a landfill, comprising:
    laying an impervious layer at inner side walls of a yard;
    laying a diversion material at a bottom of the yard;
    laying a mixture layer on the diversion material, wherein the mixture layer comprises a biogas residue, a waste carbon source, ferrous sulfate, a nutritional additive, the waste incineration fly ash and COPR;
    placing an internal-electrolysis ceramsite layer on the mixture layer;
    injecting a carbon source solution from an upper portion of the yard and collecting a leachate to a collection device through the diversion material irregularly; and
    recirculating the leachate to a top of the yard for spray reinjection.

2. The method of claim 1, wherein in the mixture layer, a weight ratio of the waste incineration fly ash to COPR to the biogas residue to the waste carbon source to ferrous sulfate to the nutritional additive is 1:(0.1-10):(0.01-5):(0.01-5):(0.15-3):(0.1-1).

3. The method of claim 1, wherein the mixture layer has a thickness of 1-8 m; and the internal-electrolysis ceramsite layer has a thickness of 1 m or less.

4. The method of claim 1, wherein the spray reinjection of the leachate is performed at a time interval of 1-48 h.

5. The method of claim 1, wherein the step of recirculating the leachate to a top of the yard for spray reinjection comprises adjusting the leachate to pH 2-5.

6. The method of claim 1, wherein the biogas residue is organic wastewater, solid organic waste or sludge.

7. The method of claim 6, wherein the biogas residue is an anaerobically-treated solid organic waste.

8. The method of claim 1, wherein the injection of the carbon source solution is performed once every 1-100 days.

9. The method of claim 1, wherein the nutritional additive is a nitrogen source, a phosphorus source, a trace element source or a combination thereof.

10. The method of claim 9, wherein a carbon source is 50% or less by weight of the carbon source solution.

11. The method of claim 9, wherein the trace element source is selected from the group consisting of boron, zinc, copper, manganese, cobalt and a combination thereof.

12. The method of claim 1, wherein the carbon source solution is a solution comprising ethanol, methanol, acetic acid or a combination thereof.

13. The method of claim 1, wherein the carbon source solution is further doped with ferrous sulfate.

14. The method of claim 1, wherein the waste incineration fly ash is a biochemically-, physically- or chemically-treated fly ash.

15. The method of claim 1, wherein COPR is a chromium-containing soil or a chromium-containing waste.

16. The method of claim 1, wherein an internal-electrolysis ceramsite of the internal-electrolysis ceramsite layer is a Fe-C internal-electrolysis ceramsite containing metallic iron and a carbon material.

* * * * *